Jan. 17, 1967  R. L. HOFFMANN  3,298,160
GAS-SOLID CHROMATOGRAPHY USING COLUMN COMPRISING
AgNO₃-COATED ALUMINA
Filed June 27, 1966
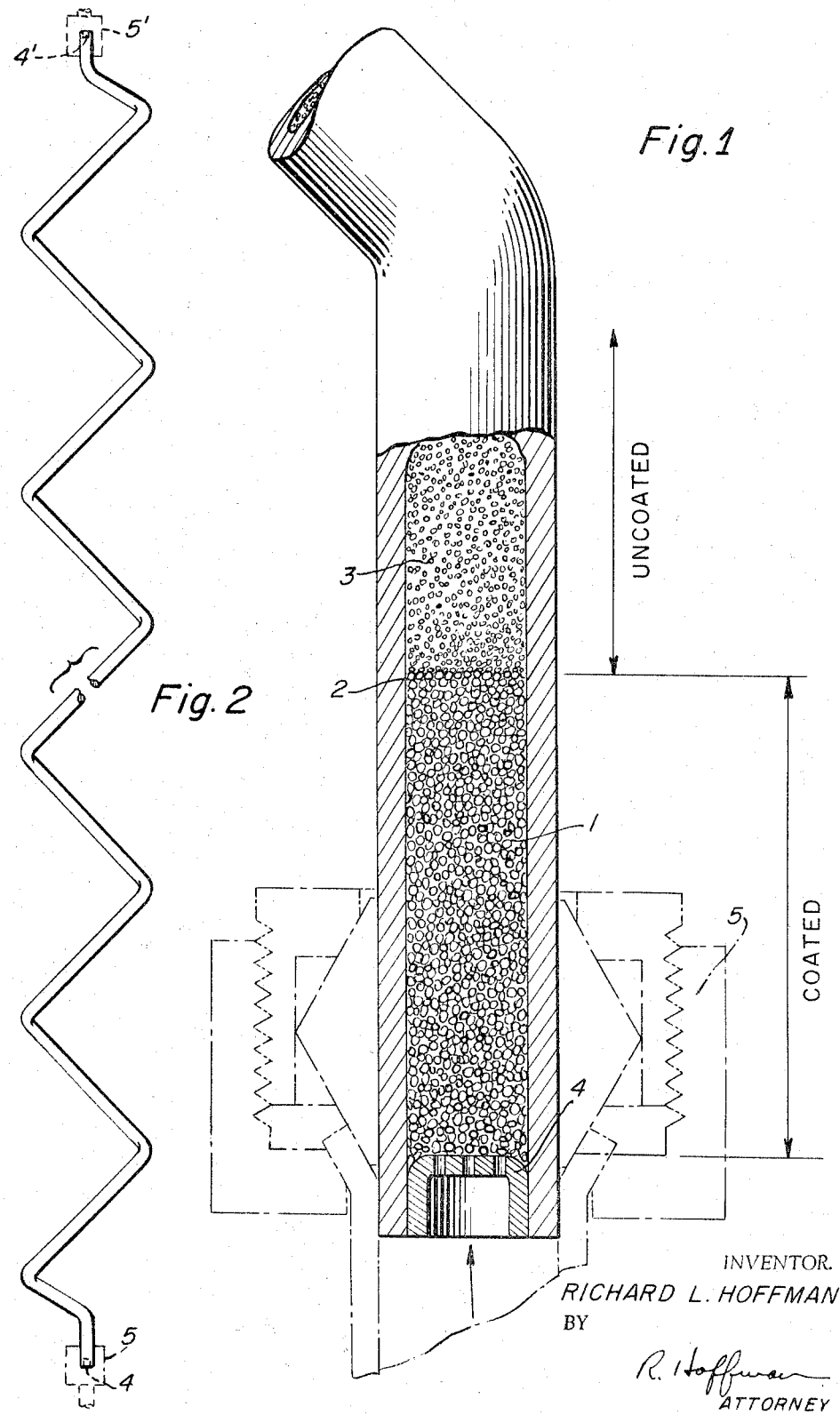
INVENTOR.
RICHARD L. HOFFMANN
BY
*R. Hoffman*
ATTORNEY

3,298,160
GAS-SOLID CHROMATOGRAPHY USING COLUMN COMPRISING AgNO₃-COATED ALUMINA

Richard L. Hoffmann, Peoria, Ill., assignor to the United States of America as represented by the Secretary of Agriculture
Filed June 27, 1966, Ser. No. 561,658
2 Claims. (Cl. 55—67)

A nonexclusive, irrevocable, royalty-free license in the invention herein described, throughout the world for all purposes of the United States Government, with the power to grant sublicenses for such purposes, is hereby granted to the Government of the United States of America.

This invention relates to a novel two constituent alumina-type absorption column for use in a gas-solid chromatograph operating in conjunction with a flame ionization detector for the resolution, for example, of mixtures of low molecular weight saturated hydrocarbons, and to an extremely inexpensive and effective means for completely removing hydrocarbon contaminants including compressor oil droplets or vapor from streams of pressurized inert gases and compressed air, thus eliminating the need for costly cylinders of especially purified hydrogen, oxygen, and carrier gas that are almost indispensable for the meaningful analysis of hydrocarbons by gas-solid chromatography.

More particularly this invention relates to the unexpected discovery that upon injecting a mixture of saturated and olefinic hydrocarbons onto the novel column of my invention, the unsaturated hydrocarbons, i.e., alkenes and alkynes that often exist in simple physical admixture with the alkanes, are not only adsorbed on a critically short segment of $AgNO_3$-coated alumina as are the alkanes but that, utterly unlike the alkanes, the unsaturated hydrocarbons are selectively and quantitatively retained on the coated alumina segment and therefore do not reach the flame ionization detector so that the resulting chromatogram contains only paraffinic peaks and can be meaningfully compared as a subtractive chromatogram with the chromatogram from an identical run using only a conventional uncoated alumina column ahead of the flame ionization detector.

My novel two-component gas-absorption column is minutely described hereinafter, but for the moment it is sufficiently described as a heated alumina column in which the conventional alumina contained only in a critically short initial (injection receiving) portion of the column has been replaced by light-protected alumina that is critically coated with about 18–22 percent by weight of $AgNO_3$. However, maximum precision and economies are obtained when the subtractive chromatography is also benefited by use of the related discovery that less costly sources of oxygen for the ionization detector and carrier gas are completely freed of hydrocarbon contaminants by first traveling them, ahead of the detector, either through a considerably increased length of the critically coated alumina or through a shorter length, e.g., 4–6 inches of alumina containing a much heavier coating of $AgNO_3$.

Gas-solid chromatographic resolution of paraffinic mixtures using an untreated alumina column ahead of a flame ionization detector is often interfered with by peaks from olefinic contaminants. Furthermore, the costs are sharply increased by the need for hydrocarbon-free sources of oxygen and of an inert carrier such as nitrogen. Although costly molecular sieves have been tried for freeing the combustion and carrier gases of contaminant hydrocarbons as well as for selectively absorbing the olefinic hydrocarbons from a paraffinic mixture to be resolved by subtractive gas chromatography, the sieves are only moderately efficient, and appreciable proportions of the contaminant molecules fail to be trapped therein, so that the chromatograms still leave much to be desired.

Accordingly, the primary object of the present invention is a completely effective, very low cost, and easily prepared means for completely and selectively removing all volatile hydrocarbon contaminants from combustion and inert carrier materials employed in gas solid adsorption chromatography and a related two-component alumina adsorption column that irreversibly absorbs all types of unsaturated hydrocarbons present in a paraffinic material and thus has unique and specific utility in the subtractive gas-solid chromatography of paraffinic substances. Other and related chromatographic adaptations will appear hereinafter.

In accordance with the principal object of the invention, I have now discovered that a critically short column of granular alumina, e.g., 60/80 mesh alumina that has been coated or impregnated with about 18–22 percent by weight of light-protected solid silver nitrate, at programmed gas chromatography temperatures, is capable of selectively and irreversibly absorbing unsaturated hydrocarbons from admixtures with alkanes without affecting the thermal elutability of the latter, but that appreciable to complete amounts of the saturated hydrocarbons also are irreversibly absorbed or extensively degraded by resistance to thermal elution if the content of $AgNO_3$ on the alumina exceeds a maximum of about 22 percent or if the portion of the column that contains the $AgNO_3$-treated alumina substantially exceeds a length of about 1 inch, i.e., comprises more than about 2 percent of the length of a conventional 48-inch column. Thus, if substantially the entire column comprises the $AgNO_3$-coated alumina, the saturates as well as the unsaturates are irreversibly held thereon and no hydrocarbons whatever pass to the untreated alumina portion of the column from which they could be thermally eluted.

In view of the above descriptive discoveries, it become clear to me that a conventional alumina gas absorption column in which the alumina in a very limited initial (proximal) portion thereof is replaced by $AgNO_3$-coated alumina would solve a major problem in the gas-solid absorption chromatography of volatile paraffinic hydrocarbons. The configuration of the alumina column is immaterial as long as its more or less conventional length (approximately 48–60 inches) can be accommodated in an available source of intense and programable heat. Since the thermal requirement for the column is most conveniently met by the use of a fully conventional helical coil, FIGURE I depicts a greatly enlarged partially cut away view of the lower initial portion of the suitably helical stainless steel column of FIGURE II which comprises a relatively very short sample-receiving segment 1 packed with fine mesh alumina that contains about 20 percent, based on the weight of the alumina, of solid $AgNO_3$, the said segment being directly contiguous through interface 2 with a relatively much longer principal segment 3 containing only conventional unimpregnated alumina. "Fiberglas" retainer plugs 4 and 4' or equivalent perforated metal rings, and conventional gas-tight couplings 5 and 5' complete my two-component adsorption column.

For removing compressor oil particles or vapor from a compressed air source so that inexpensive compressed air can be used in place of specially purified bottle oxygen it is only necessary to conduct the compressed air through about 6 inches of heated alumina coated with about 30 to 50 percent of $AgNO_3$ by weight. Similar columns, the dimensions of which are limited only by convenient placement at a thermal source, can be used to clean up laboratory-quality compressed nitrogen, helium, $CO_2$, etc.

EXAMPLE 1

*Preparation of silver nitrate impregnated alumina*

10-g. $AgNO_3$, 10-ml. $H_2O$, and 200-ml. acetone were mixed in an amber bottle. The resulting solution was then poured into 50 g. of 60/80 mesh alumina contained in a foil-protected 500-ml. flask. After a brief period of swishing, the solvent was removed on a water aspirated rotating evaporator, protection from light being observed throughout. The resulting impregnated alumina contained 20 percent by weight of $AgNO_3$ and had a very light gray color. To prepare my novel two-phase column, a widely helical ¼ inch I.D. 48 inch total length tube was completely filled with the conventional untreated granular alumina adsorbent in the usual manner, and then a calculated weight of the alumina was carefully spooned out or spilled from the proximal end, i.e., intended for the injection of samples. The thusly vacated space was then refilled with the $AgNO_3$-impregnated alumina. The column was then aged for 30 minutes at 300° C. prior to subtractive use in a flame ionization equipped gas-solid chromatography unit.

As illustrations of the subtractive gas-solid chromatography achieved with the aid of my novel absorption column, a synthetic mixture consisting of identical amounts of n-pentane, n-hexane, n-heptane, n-octane, 1-pentene, 1-hexene, 1-heptene, and 1-octene was chromatographed first on a 48-inch conventional alumina column using an initial temperature of 150° C. that was programmed at the rate of 21° C./min. to a maximum of 350° C., followed by an identical subtractive run in which the conventional 48-inch, ¼-inch I.D. alumina column was replaced by a column in which the first inch contained exclusively alumina containing 20 percent by weight of $AgNO_3$. Whereas the conventional chromatogram showed peaks for each of the saturates and interspersed between the latter the peaks of the corresponding olefins, thus limiting the accuracy of the area determinations, the repeat chromatograph from the $AgNO_3$-containing column showed an unchanged elution of the paraffins and a complete absence of any olefinic peaks. With the two chromatograms, highly precise plottings of component areas became possible.

Similar results were obtained on a mixture of saturated and unsaturated cyclic hydrocarbons, namely cyclopentane, cyclohexane, cyclopentene, and cyclohexene. With the $AgNO_3$-containing column the cyclenes were completely removed while the cyclanes were eluted unaltered.

Using my two-component column with the $AgNO_3$-treated portion at room temperature, ethylene is completely removed from a mixture with ethane.

A 48-inch column containing exclusively alumina that was impregnated with 20 percent by weight of $AgNO_3$ was injected with a mixture of $C_1$ to $C_8$ n-alkanes and $C_2$ to $C_8$ 1-alkenes, the $C_5$–$C_8$ components being present in a 1:1 v./v. ratio. The column was programmed from an initial temperature of 75° C. to a maximum of 375° C., increasing at the rate of 21° C. per minute. The chromatogram showed the expected complete removal of all olefins, but there were also progress reductions in the n-alkane peak areas corresponding to the increased carbon number of the alkanes, thus showing that when silver nitrate is present throughout the column, such length as a degradative effect on even saturated hydrocarbons, apparently because the temperature programming does not move the relatively less volatile saturates through the reaction zone before these constituents of the sample are exposed to the combined effects of high temperature and relatively prolonged exposure to silver nitrate. However, as indicated, when the $AgNO_3$-treated portion of the column is quite short, the saturates are moved out of that zone before they can be destroyed unless even such a column is operated isothermally at a temperature above 200° C., in which case both olefins and paraffins are consumed regardless of the length of the coated portion of the column.

The observed effects are deduced as arising from the following mechanisms. At low temperatures electron-high olefinic bonds are probably retained on the $$AgNO_3 : Al_2O_3$$

by weak $\pi$-complex bonds. As the column temperature is increased, paraffins move through the short $AgNO_3$-containing zone unchanged and escape oxidative effects thereof before the temperature becomes excessive. The Ag-olefin complex in the presence of $O_2$ liberated by decomposing $AgNO_3$, thermally cleaves at the double bond to an acid having one less carbon atom than the parent 1-olefin, the acid, like other polar oxygenated materials, e.g., alcohols and aldehydes being bound to alumina even in the absence of $AgNO_3$.

I claim:

1. An improved 4-foot helical gas absorption column for use in gas-solid chromatography of hydrocarbons, said column comprising a tube consisting of a short sample injection portion amounting to about 4 percent of the total length of the column, said portion containing exclusively finely granular alumina that has been impregnated with about 20 percent based on the weight of alumina of light-protected solid $AgNO_3$, and a relatively long elution portion containing only nonimpregnated granular alumina.

2. A process for removing hydrocarbon contaminants from inexpensive pressurized sources of oxygen and of inert carrier gas so as to permit their use in the flame ionization equipped gas-solid chromatography of volatile hydrocarbons, said process comprising passing the hydrocarbon contaminated gas through at least about 6 inches of light-protected granular alumina impregnated with not less than about 30 percent of solid $AgNO_3$ based on the dry weight of the alumina, the $AgNO_3$-impregnated alumina being held at a temperature of about 75° C., and directly conducting the emergent contaminant-free gas to a nonimpregnated alumina gas chromatography column.

No references cited.

REUBEN FRIEDMAN, *Primary Examiner.*

J. DECESARE, *Assistant Examiner.*